US011245692B2

(12) United States Patent
Short, III et al.

(10) Patent No.: US 11,245,692 B2
(45) Date of Patent: Feb. 8, 2022

(54) USER AUTHENTICATED ENCRYPTED COMMUNICATION LINK

(71) Applicant: VirnetX, Inc., Zephyr Cove, NV (US)

(72) Inventors: Robert Dunham Short, III, Leesburg, VA (US); Nathaniel Jackson Short, Crofton, MD (US); Michael Williamson, South Riding, VA (US)

(73) Assignee: VirnetX, Inc., Zephyr Cove, NV (US)

( * ) Notice: Subject to any disclaimer, the term of this patent is extended or adjusted under 35 U.S.C. 154(b) by 0 days.

(21) Appl. No.: 16/299,434

(22) Filed: Mar. 12, 2019

(65) Prior Publication Data

US 2019/0215321 A1 Jul. 11, 2019

Related U.S. Application Data

(63) Continuation of application No. 15/376,434, filed on Dec. 12, 2016, now Pat. No. 10,498,728, which is a continuation of application No. 14/037,301, filed on Sep. 25, 2013, now Pat. No. 9,521,130.

(60) Provisional application No. 61/705,457, filed on Sep. 25, 2012.

(51) Int. Cl.
*H04L 29/06* (2006.01)
*H04L 29/12* (2006.01)

(52) U.S. Cl.
CPC ...... *H04L 63/0861* (2013.01); *H04L 61/1511* (2013.01); *H04L 63/0428* (2013.01); *H04L 63/08* (2013.01); *H04L 63/10* (2013.01)

(58) Field of Classification Search
None
See application file for complete search history.

(56) References Cited

U.S. PATENT DOCUMENTS

| 6,502,135 B1 * | 12/2002 | Munger ............ H04L 63/0272 709/225 |
| 6,668,246 B1 | 12/2003 | Yeung et al. |
| 7,519,202 B2 | 4/2009 | Caspi et al. |
| 7,978,714 B2 | 7/2011 | Rao et al. |

(Continued)

OTHER PUBLICATIONS

Allen, et al., "Securing a Wireless Network," Nov. 20-23, 2002, pp. 213-215, SIGUCCS'02, Providence, USA.

(Continued)

*Primary Examiner* — William J. Goodchild
(74) *Attorney, Agent, or Firm* — Lee & Hayes, P.C.

(57) ABSTRACT

Systems and methods are provided for establishing a secure communication link between a first client and a second client. One exemplary computer-implemented method for establishing a secure communication link between a first client and a second client includes accessing, from a storage, identification information of a user of the first client. The method further includes receiving a Domain Name Service (DNS) request from the first client requesting a secure network address corresponding to a secure domain name associated with the second client. The method further includes authenticating the user based on the user identification information. The method also includes transmitting the secure computer network address in response to the DNS request based on a determination that the user has been authenticated. A secure communication link between the first client and the second client is established based on the secure computer network address.

20 Claims, 7 Drawing Sheets

(56) References Cited

U.S. PATENT DOCUMENTS

| | | | |
|---|---|---|---|
| 8,140,573 B2* | 3/2012 | McKay | G06Q 10/10 |
| | | | 707/778 |
| 8,141,135 B2 | 3/2012 | Nagami et al. | |
| 8,166,528 B2* | 4/2012 | Inoue | H04L 9/3242 |
| | | | 726/6 |
| 8,201,233 B2 | 6/2012 | Beaulieu et al. | |
| 8,266,443 B2 | 9/2012 | Errico | |
| 2001/0039619 A1 | 11/2001 | Lapere et al. | |
| 2001/0054889 A1* | 12/2001 | Danet | H03H 7/12 |
| | | | 324/76.29 |
| 2002/0004902 A1* | 1/2002 | Toh | H04L 63/0442 |
| | | | 713/170 |
| 2002/0035681 A1* | 3/2002 | Maturana | H04L 69/166 |
| | | | 713/151 |
| 2002/0062342 A1* | 5/2002 | Sidles | H04L 67/2804 |
| | | | 709/203 |
| 2002/0103931 A1* | 8/2002 | Mott | H04L 12/4641 |
| | | | 709/245 |
| 2002/0129285 A1 | 9/2002 | Kuwata et al. | |
| 2002/0176611 A1 | 11/2002 | Dong | |
| 2003/0014706 A1* | 1/2003 | Poeluev | H03M 13/07 |
| | | | 714/752 |
| 2003/0026428 A1* | 2/2003 | Loisel | H04L 63/061 |
| | | | 380/277 |
| 2003/0131245 A1* | 7/2003 | Linderman | H04L 63/0218 |
| | | | 713/176 |
| 2004/0034771 A1* | 2/2004 | Edgett | G06Q 20/14 |
| | | | 713/168 |
| 2004/0054889 A1 | 3/2004 | Pitsos | |
| 2004/0098485 A1* | 5/2004 | Larson | H04L 63/1458 |
| | | | 709/227 |
| 2005/0131997 A1* | 6/2005 | Lewis | G06F 21/57 |
| | | | 709/203 |
| 2007/0034771 A1* | 2/2007 | Liu | A47F 5/0006 |
| | | | 248/682 |
| 2007/0056022 A1 | 3/2007 | Dvir | |
| 2007/0156829 A1* | 7/2007 | Deboy | G06F 21/33 |
| | | | 709/206 |
| 2007/0178914 A1 | 8/2007 | Montenegro | |
| 2007/0192842 A1* | 8/2007 | Beaulieu | H04L 63/068 |
| | | | 726/9 |
| 2008/0183853 A1* | 7/2008 | Manion | H04L 67/1093 |
| | | | 709/223 |
| 2009/0083544 A1* | 3/2009 | Scholnick | G06F 21/14 |
| | | | 713/186 |
| 2009/0112814 A1 | 4/2009 | Statia et al. | |
| 2009/0183247 A1 | 7/2009 | Kasper et al. | |
| 2010/0186072 A1 | 7/2010 | Kumar | |
| 2010/0281146 A1* | 11/2010 | Lee | H04L 61/1511 |
| | | | 709/221 |
| 2011/0191586 A1* | 8/2011 | Jung | H04L 9/0844 |
| | | | 713/168 |
| 2012/0131665 A1 | 5/2012 | Larson | |
| 2012/0159607 A1 | 6/2012 | Wei et al. | |
| 2012/0173867 A1* | 7/2012 | Hirabayashi | G06F 21/51 |
| | | | 713/150 |
| 2012/0204236 A1 | 8/2012 | Chen et al. | |
| 2012/0226795 A1 | 9/2012 | Larson et al. | |
| 2019/0207934 A1 | 7/2019 | Short, III et al. | |

OTHER PUBLICATIONS

Office action for U.S. Appl. No. 15/376,434, dated Nov. 16, 2018, Short,, "User Authenticated Encrypted Communication Link", 6 pages.

Final Office Action dated Mar. 14, 2019 for U.S. Appl. No. 15/376,434 "User Authenticated Encrypted Communication Link" Short, 6 pages.

Non Final Office Action dated Jan. 6, 2020 for U.S. Appl. No. 16/299,607 "User Authenticated Encrypted Communication Link" Short et al., 10 pages.

U.S. Office Action dated Jul. 20, 2020 for U.S. Appl. No. 16/299,607 "User Authenticated Encrypted Communication Link" Short, 9 pages.

Non Final Office Action dated Mar. 15, 2021 for U.S. Appl. No. 16/299,607 "User Authenticated Encrypted Communication Link" Short, 9 pages.

* cited by examiner

USER AUTHENTICATED ENCRYPTED COMMUNICATION LINK

CROSS-REFERENCE TO RELATED APPLICATIONS

The present application is a continuation of U.S. application Ser. No. 15/376,434, filed Dec. 12, 2016, entitled "USER AUTHENTICATED ENCRYPTED COMMUNICATION LINK", which is a continuation of U.S. application Ser. No. 14/037,301, filed Sep. 25, 2013, now U.S. Pat. No. 9,521,130, issued Dec. 13, 2016, entitled "USER AUTHENTICATED ENCRYPTED COMMUNICATION LINK", which claims the benefit of priority under 35 U.S.C § 119 from U.S. Provisional Patent Application Ser. No. 61/705,457 entitled "Biometric Enhanced Secure Domain Names," filed on Sep. 25, 2012, the disclosure of which is hereby incorporated by reference in its entirety for all purposes.

BACKGROUND

Technical Field

The present disclosure relates generally to the field of secure electronic communications between two or more electronic communications devices. More particularly, and without limitation, the present disclosure relates to systems and methods for establishing a secure communication link between electronic communications devices in which users of the devices are authenticated to establish the secure communication link.

Description of the Related Art

The Internet has experienced explosive growth and use in recent years. Moreover, with the advent of smartphones, tablets, and personal digital assistants (PDAs), users have become accustomed to transmitting and receiving information from users of other devices on a regular basis and from any location. A vast amount of such electronic communication, however, remains vulnerable to access by third party eavesdroppers, who may access the information in transit between the communicating electronic devices and/or users. It is desirable to exchange information privately between the participating devices, without allowing unauthorized access to the information.

A variety of methods have been proposed to establish secure communication links between devices. Some of these methods rely on encryption of the information before it is communicated. This requires providing a recipient device with means to unencrypt the information upon receipt. Although the information may be encrypted during transit, current methods may not prevent a rogue user with access to another user's device from accessing the encrypted information received by that user's device.

SUMMARY

In view of the above deficiencies, there is a need for improved systems and methods for establishing a secure communication link between electronic devices in which the users of the communicating devices are identified and authenticated. More particularly, there is a need for improved systems and methods, which restrict use of the secure communication link to authenticated users at both ends of the link.

In accordance with the present disclosure, systems and methods are provided for establishing a secure communication link between two or more electronic communication devices. In accordance with certain embodiments, a method for establishing a secure communications link with authenticated users at both ends of the link is provided. As disclosed herein, embodiments of the present disclosure may allow an electronics communication device or a client to establish a secure communication link with another client only when users of both clients have been authenticated. Embodiments of the present disclosure may also allow registration of users with their authentication information to enable authentication of the users before establishing a secure communication link.

In accordance with one exemplary embodiment, a computer-implemented method is provided for establishing a secure communication link between a first client and a second client. By way of example, the method comprises: accessing, from a storage, identification information of a user of the first client; receiving a Domain Name Service (DNS) request from the first client requesting a secure network address corresponding to a secure domain name associated with the second client; authenticating the user based on the user identification information; and transmitting the secure computer network address in response to the DNS request based on a determination that the user has been authenticated, wherein a secure communication link between the first client and the second client is established based on the secure computer network address.

In accordance with another exemplary embodiment, the step of authenticating the user in the computer-implemented method includes: receiving, from the first client, a first hash value based on the identification information; comparing the first hash value to a second hash value; sending an accept notification to the first client when the first hash value matches the second hash value; and sending a reject notification to the first client when the first hash value does not match the second hash value.

In accordance with another exemplary embodiment, the step of receiving the first hash value in the computer-implemented method includes: retrieving a random vector and a random hash key from the server; sending the retrieved random vector and random hash key to the first client; receiving, from the first client, the first hash value, the first hash value being generated by: generating a user vector by combining the random vector and the identification information; and performing a hashing operation on the user vector using the random hash key.

In accordance with another exemplary embodiment, the computer-implemented method further includes: receiving a user name for the user from the first client; accessing a database that stores second hash values in association with user names; and retrieving the second hash value corresponding to the user name from the database.

In accordance with another exemplary embodiment, the computer-implemented method further includes: authenticating, in addition to the user, the first client; and transmitting the secure computer network address in response to the DNS request based on a determination that the user has been authenticated and also that the first client has been authenticated.

In accordance with another exemplary embodiment, a secure domain name server is provided for establishing a secure communication link between a first client and a second client. By way of example, the secure domain name server includes: a data storage device storing identification information for a plurality of clients; and one or more processors. The one or more processors may be configured to: access, from the storage, identification information of a user of the first client; receive a Domain Name Service (DNS) request from the first client requesting a secure network address corresponding to a secure domain name associated with the second client; authenticate the user based on the user identification information; and transmit the secure computer network address in response to the DNS request based on a determination that the user has been authenticated, wherein a secure communication link between the first client and the second client is established based on the secure computer network address.

In accordance with another exemplary embodiment, the one or more processors of the server may be further configured to: receive, from the first client, a first hash value based on the identification information; compare the first hash value to a second hash value; send an accept notification to the first client when the first hash value matches the second hash value; and send a reject notification to the first client when the first hash value does not match the second hash value.

In accordance with another exemplary embodiment, the one or more processors of the server may be further configured to: retrieve a random vector and a random hash key from the server; send the retrieved random vector and random hash key to the first client; receive, from the first client, the first hash value, the first hash value being generated by: generating a user vector by combining the random vector and the identification information; and performing a hashing operation on the user vector using the random hash key.

In accordance with another exemplary embodiment, the one or more processors of the server may be further configured to: receive a user name for the user from the first client; access a database that stores second hash values in association with user names; and retrieve the second hash value corresponding to the user name from the database.

In accordance with another exemplary embodiment, the one or more processors of the server may be further configured to: authenticate, in addition to the user, the first client; and transmit the secure computer network address in response to the DNS request based on a determination that the user has been authenticated and also that the first client has been authenticated.

In accordance with another exemplary embodiment, the one or more processors of the server may be further configured to: determine whether the first client is enabled for biometric authentication of the user; and perform the accessing and authentication steps based on a determination that the first client is enabled for biometric authentication of the user.

Additional objects and advantages of the embodiments of the present invention will be set forth in part in the description which follows, and in pan will be obvious from the description, or may be learned by practice of the embodiments of the present disclosure.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this present disclosure, illustrate several embodiments of the present disclosure and, together with the description, serve to explain the principles of the present disclosure. In the drawings.

DETAILED DESCRIPTION

Reference will now be made in detail to the present exemplary embodiments of the present disclosure, examples of which are illustrated in the accompanying drawings. Wherever possible, the same reference numbers will be used throughout the drawings to refer to the same or like parts.

Figure 1:
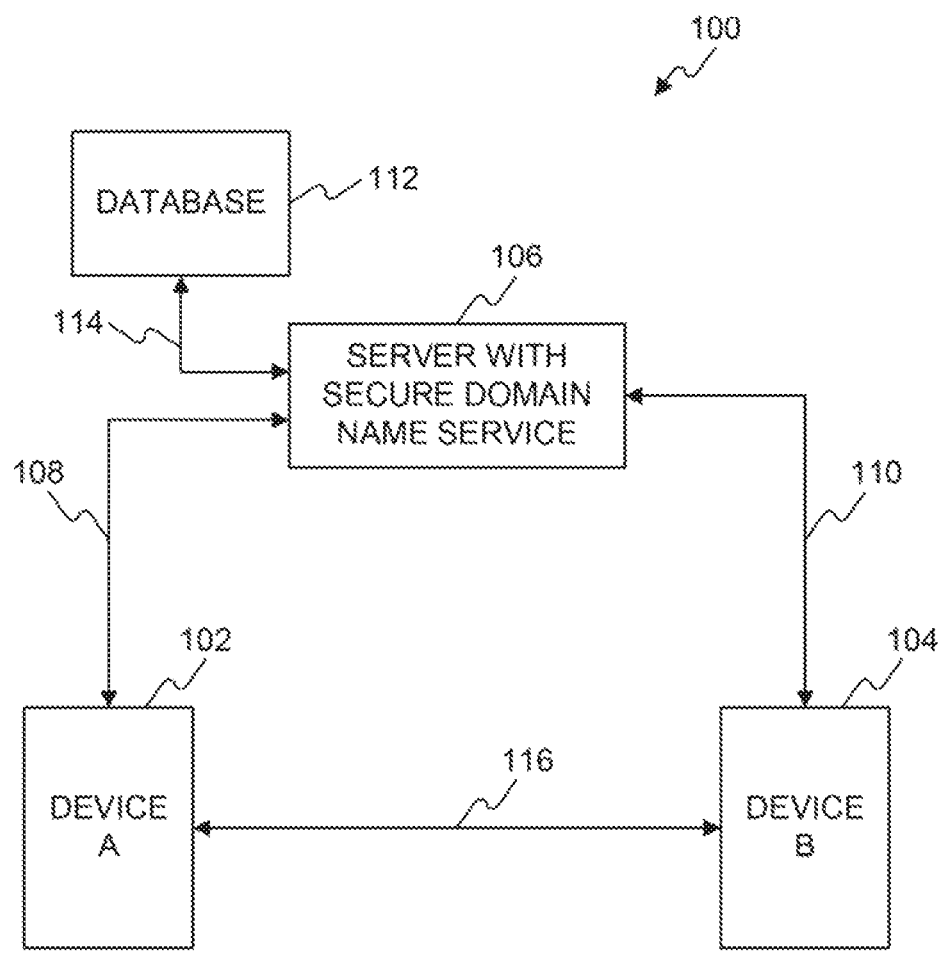
FIG. 1 shows an exemplary secure communication system for implementing embodiments of the present disclosure.

FIG. 1 shows a block diagram of an exemplary secure communication system 100 for implementing embodiments and features of the present disclosure. The arrangement and number of components in system 100 is provided for purposes of illustration. Additional and/or different arrangements, components, or other modifications may be made, consistent with the present disclosure.

As shown in FIG. 1, system 100 may include one or more devices or clients 102, 104. By way of example, clients 102, 104 may include smartphones, tablets, netbooks, electronic readers, personal digital assistants, personal computers, laptops, pagers, and/or other types of user electronic communication devices. It is also contemplated that clients 102, 104 may include desktop computers, servers, or other user devices connected to servers. Clients 102, 104 may be implemented with devices, and/or applications running thereon.

Client 102 may be configured to communicate with server 106 via a communication link 108. Communication link 108 may be part of the Internet and/or another type of wide area network, an intranet, a metropolitan area network, a local area network, a wireless network, a cellular communications network, etc. In some embodiments, client 102 or server 106 may configure communication link 108 as a secure communication link between client 102 and server 106. For example, communication link 108 may be an administrative virtual private network (VPN) between first client 102 and server 106, which may be established using the systems and methods disclosed in U.S. patent application Ser. No. 13/617,375 (the '375 application), the entire contents of which are expressly incorporated herein by reference. In other embodiments, communication link 108 may be an encrypted communication link between client 102 and server 108. In still other embodiments, communication link 108 may be an "in-the-clear" link between client 102 and server 106, as described in the '375 application.

Like client 102, client 104 may be configured to communicate with server 106 via a communication link 110. Communication link 110 may have a similar structure, features, and/or method of operation as communication link 108. Further, like communication link 108, in some embodiments, client 104 or server 106 may configure communication link 110 as a secure communication link between client 104 and server 106 similar to that described above with respect to communication link 108.

Client 102 may include a number of components, such as one or more hardware computer processor(s) (not shown) for performing operations related to the present disclosure. Client 102 may also include memory device(s) (not shown) and/or other data storage devices for storing instructions executed by the processor(s) and/or for storing data. Examples of memory devices and other storage devices include hard drives, RAID arrays, NOR or NAND flash memory devices, Read Only Memory (ROM) devices, etc. Client 102 may also include a display device (not shown) for displaying a variety of data and information to a user of client 102. In addition, client 102 may be equipped with input devices (not shown). By way of example, these input devices may include physical keyboards, virtual touch-screen keyboards, mice, joysticks, styluses, etc. In certain embodiments, client 102 may also be capable of receiving input through a microphone using voice recognition applications. Consistent with the disclosed embodiment, the input device may be configured to accept biometric user identification input from the user, such a photograph, a fingerprint, a speech sample, a facial image, an image of a retina or iris, or any other biometric information of the user. Client 104 may include components, features, and/or methods of operation as described above with respect to client 102.

Server 106 may identify one or more servers configured to interact with clients 102, 104 and/or database 112. Like clients 102, 104, server 106 may include a number of computing components, features, and/or methods of operation similar to those described above with respect to clients 102, 104, e.g., hardware processor(s), memory(ies), and/or data storage devices. In addition, consistent with some embodiments, server 106 may be implemented as a unitary server, a server system comprising a plurality of servers, or a server farm comprising a load balancing system and a plurality of servers. In one exemplary embodiment, server 106 may be configured as a secure domain name service. For example, server 106 may provide a secure domain name service as disclosed in the '375 application. In general, server 106 may be configured to receive a query, such as a domain name server (DNS) request, for a secure network address corresponding to a secure domain name.

Clients 102, 104 may establish a secure communication link 116 between each other using secure domain name information provided by server 106, using one or more methods described in the '375 application combined with the one or more methods described in this disclosure. Communication link 116 may be a secure communication link between clients 102, 104 over a public network, such as the Internet, a wide area network, a metropolitan area network, a wireless network, a cellular communications network, etc. In one embodiment, communication link 116 may be a virtual private network (VPN) established between clients 102, 104, which may be established using the systems and methods disclosed in the '375 application. The VPN may be a network of computers, including clients 102, 104, which privately and directly communicate with each other by encrypting traffic over insecure communication paths (e.g., the public network) between the computers as though they were on the same private network. For example, the VPN may implement packet tunneling and/or packet payload encryption over the public network. In one embodiment, the tunneling may include a network address hopping regime and/or a packet transport scheme described in the '375 application. In other embodiments, communication link 116 may simply be an encrypted communication link.

Server 106 may be in communication with database 112 via communication link 114. Database 112 may be collocated with server 102, or may include one or more logically and/or physically separate databases (e.g., as a service provider) configured to store data. The data stored in database 112 may be received from servers 106, directly from clients 102, 104, and/or may be provided as input using conventional methods (e.g., data entry, data transfer, data uploading, etc.). The data stored in database 112 may take or represent various forms including, but not limited to, user names, user identification information, and/or other data required to establish secure communication links between clients 102, 104 and/or server 106.

In some embodiments, database 112 may be implemented using a computer-readable storage medium. In other embodiments, database 112 may be maintained in a network attached storage device, in a storage area network, or combinations thereof, etc. Furthermore, database 112 may be maintained and queried using numerous types of database software and programming languages, such as SQL, MySQL, IBM DB2®, Microsoft Access®, PERL, C/C++, Java®, etc.

Although the above description describes clients 102, 104 and server 106 separately, clients 102, 104 may perform the role of servers 106 and vice-versa. Server 106 may also be collocated with, or on client 102, 104. For example, server 106 may be implemented as a secure name service module running in the client's web browser. Additionally, clients 102, 104 may have the same hardware components as servers 106. Furthermore, the embodiments of this disclosure may also be implemented on the same device serving, for example, both as a client 102, 104 and a server 106. Additionally, although the above description describes database 112 as being associated with server 106, it is contemplated that clients 102, 104 may additionally or alternatively communicate with database 112 to store or retrieve data and other information.

Figure 2:
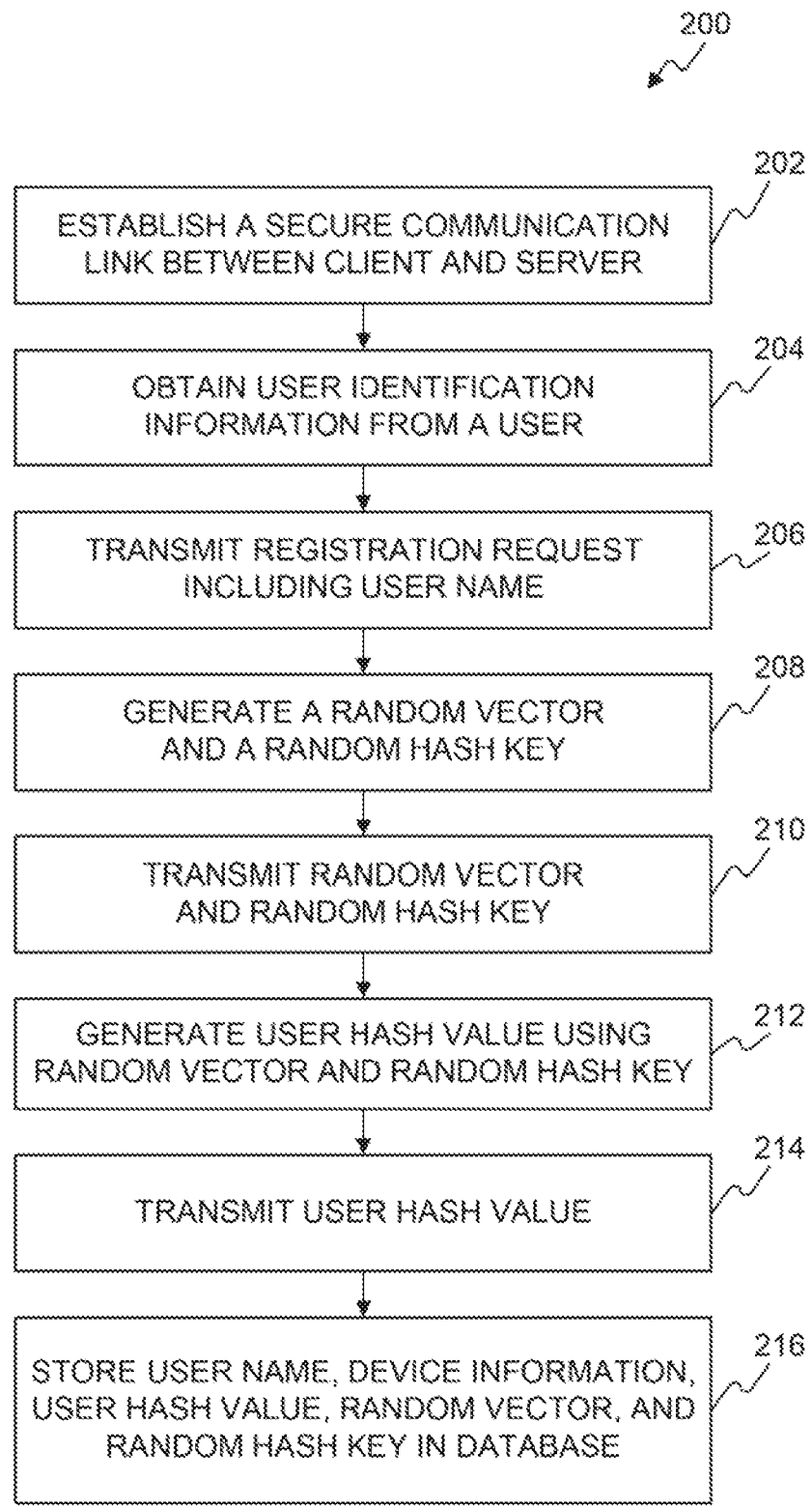
FIG. 2 shows an exemplary method of registering a user, consistent with an embodiment of the present disclosure.

FIG. 2 shows a flowchart of an exemplary registration method 200, consistent with an embodiment of the present disclosure. As further described below, the exemplary registration method 200 may be implemented for registering one or more users of clients 102, 104 with server 106, database 112, and/or the secure name service implemented by server 106. Method 200 may be implemented by the processor(s) of client 102 and/or server 106 executing computer-readable program instructions.

As shown in FIG. 2, method 200 may include a step 202 of establishing a secure communication link 108 (e.g., an administrative VPN or an "in-the-clear" link) between client 102 and server 106. Step 202 may be accomplished using one or more of the methods disclosed in the '375 application. Upon establishing the secure communication link between client 102 and server 106, server 106 knows the secure domain name of client 102. In one exemplary embodiment, client 102 may have a secure domain name having the form "device-a.user-a.domain.scom," where "device-a" may refer to client 102 and "user-a" may refer to a user of client 102. Additionally, "a.domain.scom" may refer to the secure domain of client 102. Further, "device-a" may include device information regarding client 102. For example, "device-a" may include a secure Internet protocol (IP) address of client 102. In some exemplary embodiments, "device-a" may include other characteristics of client 102, such as a MAC Address or any other information, which may uniquely identify client 102.

Method 200 may include a step 204 of obtaining user identification information from a user of client 102. In one exemplary embodiment, client 102 may obtain the user identification information via one or more input devices associated with client 102. Client 102 may also be configured to store the user identification information received from the input devices in a memory or storage device associated with client 102. Client 102 may also be configured to store the user identification information received from the input devices in a temporary storage device associated with client 102. In one exemplary embodiment, client 102 may access a memory or other storage device associated with client 102 to retrieve previously stored user identification information for a user.

The user identification information may include first identification information (for example, a user name of the user), second identification information (for example, biometric identification information of the user), or a combination thereof. The user name may include a login name of the user of client 102, an e-mail address of the user, or any combination of letters, numbers, and/or symbols representing the user. In one exemplary embodiment, the user name may include the entire secure domain name for client 102, including the user name. For example, the user name of a "user-a" of client 102 may take the form "device-a.user-a.domain.scom." In another exemplary embodiment the user name may include the user name associated with the domain of client 102. For example, the user name may take the form "user-a.domain.scom."

The biometric identification information (or "biometric information) may be a photograph, a fingerprint, a speech sample, a facial image, an image of a retina or iris, of the user or any other biometric information known in the art for the user. One of ordinary skill in the art would recognize that the data representing the biometric information may take many forms, including an image file, a sound file, or a set of values representing the biometric information. In one exemplary embodiment, the biometric information may be represented using a biometric identification vector (also referred to as "user identification vector) containing values representing the biometric information. It is to be appreciated that a biometric measurement for a user (e.g., a fingerprint scan), taken at client device 102, may be noisy and therefore may not be exactly identical each time a biometric measurement is obtained from a user. In one exemplary embodiment, the biometric information obtained from a user of client 102 may be rounded or approximated, within an acceptable deviation or variation of the biometric information, and the rounded or approximated biometric information may be represented by one or more user identification vectors. While the embodiments described below is illustrated with a single user identification vector, it should be understood that one practiced in the art can extend these embodiments to include multiple identification vectors and multiple hash values. Rounding or approximating the biometric information in this manner may reduce variations in the biometric information, within the acceptable deviation, so that that the biometric information can be reliably used in the user authentication methods 300 (FIG. 3) and 400 (FIG. 4), which will be discussed in detail below.

Method 200 may include a step 206 of transmitting a registration request including a user name. In one exemplary embodiment client 102 may send a registration request including the first identification information (for example, user name) to server 106. The user name may be the user name entered by the user in step 204. Depending upon the particular implementation, the registration request may or may not include the user identification vector. Method 200 may include a step 208 of generating a random vector and a random hash key. In one exemplary embodiment, upon receipt of the user name from client 102, server 106 may generate a random vector, which may include randomly-selected values. The random vector may be one-dimensional or multi-dimensional, and may have a randomly selected size. Further, in step 208, server 106 may generate a random hash key. The random hash key and/or the random vector may be generated using randomization schemes well known in the art.

As further illustrated in FIG. 2, method 200 may include a step 210 of transmitting the random vector and the random hash key. In one exemplary embodiment, server 106 may transmit the random vector and random hash key to client 102.

Method 200 may further include a step 212 of generating a hash value representing the user based on the random vector and random hash key received from server 106. In one exemplary embodiment, client 102 may combine the random vector received from server 106 with a second identification information of the user (for example, user identification vector obtained in step 204) to create a user vector. Client 102 may combine the random vector and user identification vector in many ways. For example, client 102 may add the random vector to the user identification vector. One of ordinary skill in the art would recognize, however, that client 102 may combine the random vector and the user identification vector using one or more other mathematical operations well known in the art. Client 102 may generate a user hash value by performing a hashing operation on the user vector using the random hash key provided by server 106. Client 102 may employ hashing algorithms well known in the art to generate the hash value.

Method 200 may also include a step 214 of transmitting the user hash value. In one exemplary embodiment, client 102 may transmit the user hash value to server 106. Further, process 200 may include a step 216 of storing the user name in database 112. Step 216 may also include storing device information of client 102, the random vector, the random hash key, and the user hash value received from client 102, in association with the user name and device information in database 112. In one exemplary embodiment, server 106 may store the user name, device information of client 102, the random vector, the random hash key, and the user hash value in association with each other in database 112.

One of ordinary skill in the art would recognize that biometric information of the same user, collected on different devices, may be different. One of ordinary skill in the art would further recognize that to correctly identify a user and the user's device, i.e., client 102, it may be necessary to associate device information of the device on which biometric information was obtained for a user with the user name of the user. Server 106 may pre-register users of client 102 in database 112 using method 200. Further, server 106 may pre-register users of client 104 in database 112, using method 200, in a manner similar to that described above with respect to registering users of client 102. However, it is to be appreciated that registration method 200 may be performed at any time before or during the course of establishing of communication link 116.

While the above exemplary registration process has been described with respect to database 112 associated with server 106, it will be understood that a similar registration process may occur with respect to databases associated with clients 102 and 104. For example, in addition to registering with server 106, client 102 may register itself with client 104. Accordingly, steps 202 through 216 may be carried out between client 102 and 104 with client 104 storing in its database device information of client 102, the random vector, the random hash key, and the user hash value received from client 102. Similarly, client 104 may register itself with client 102. Additionally, client 104 may perform a similar registration process with server 106 and/or client 102 in order to register itself. In the event clients 102 and 104 register with each other, the registration process may be carried out through server 106, which may act as an intermediary. Alternatively, clients 102 and 104 may establish a communication link with each other that may be secure to the extent that the data transmitted on the link is encrypted, for example. At this time, clients 102 or 104 may not be aware of each other's secure IP or network address that is used to establish the secure communication link 116 in the methods 300 (FIG. 3) and (FIG. 4), discussed below.

Figure 3:
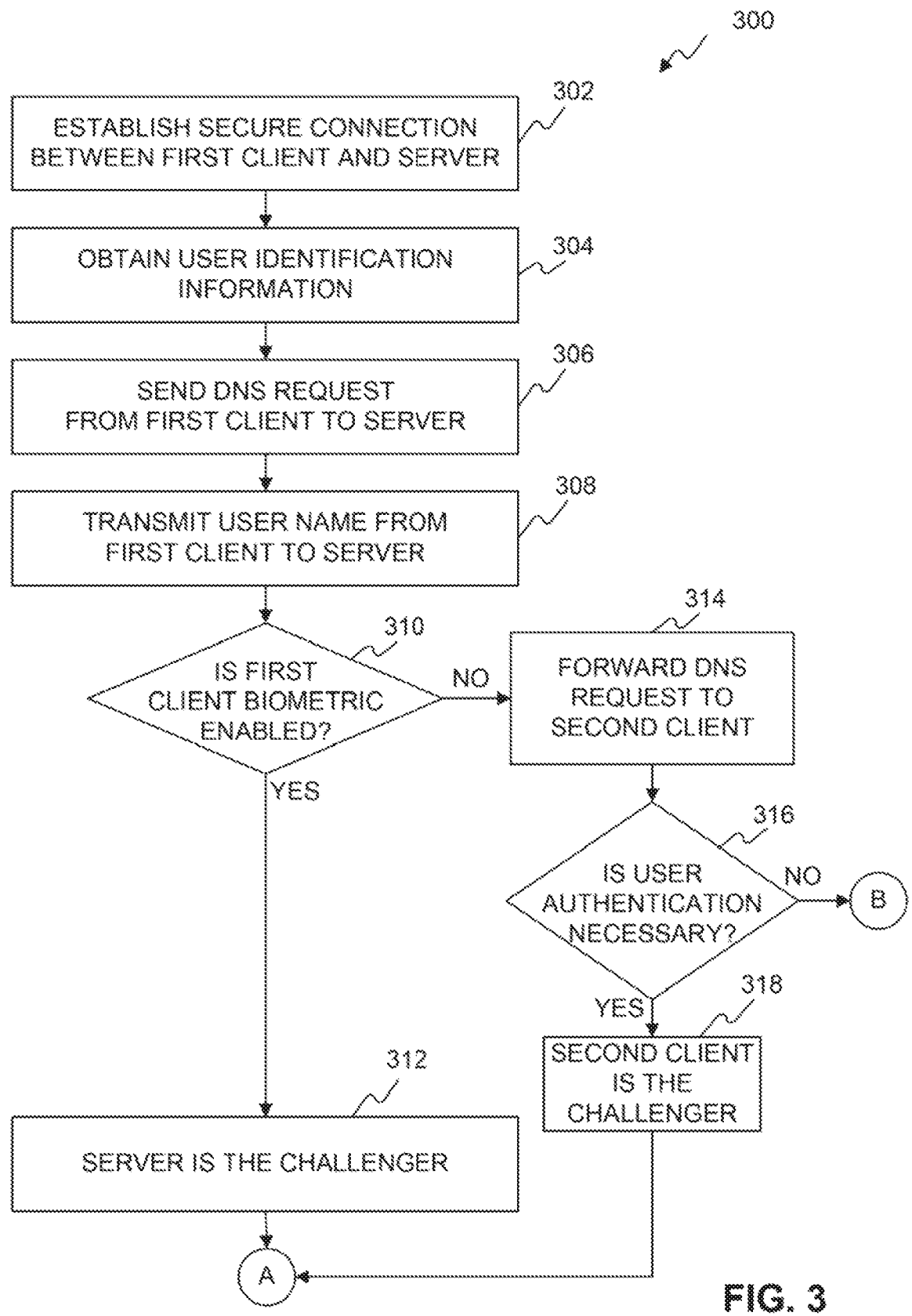
FIG. 3 shows an exemplary method of authenticating a user to provide a user-authenticated secure communication link, consistent with embodiments of the present disclosure.

FIG. 3 shows a flowchart of an exemplary method 300 for establishing a user-authenticated secure communication link between first client 102 and second client 104, consistent with an embodiment of the present disclosure. Depending upon the desired configuration, method 300 may occur after the registration process of FIG. 2, or may be performed as part, or during the course, of method 300.

As shown in FIG. 3, method 300 may include a step 302 of establishing a secure communication link 108 (e.g., an administrative VPN or an "in-the-clear" link) between client 102 and server 106. Step 302 may be accomplished using one or more of the methods disclosed in the '375 application in a manner similar to that described above with respect to step 202 of method 200 (FIG. 2).

Method 300 may include a step 304 of obtaining user identification information. In one exemplary embodiment, client 102 may obtain the user identification information of a user of client 102. Client 102 may obtain user identification information in a manner similar to that described above with respect to step 204 of method 200 (FIG. 2).

Method 300 may include a step 306 of sending a DNS request from client 102 to server 106. The DNS request may include a request to lookup a secure network address corresponding to a secure domain associated with client 104. An example of a secure domain associated with client 104 may be "device-b.user-b.domain.scom," or "device-b.domain.scom," or any other secure domain name that uniquely identifies second client 104. It is to be appreciated, however, that the secure domain name may have any desired format.

Method 300 may also include a step 308 of transmitting the user name to server 106. In one exemplary embodiment, client 102 may transmit a user name obtained in step 304 to server 106. The user name may be similar to that described earlier with respect to step 204 of process 200 (FIG. 2). One of ordinary skill in the art would recognize that steps 306 and 308 may be performed simultaneously or sequentially in any order.

Method 300 may further include a step 310 in which server 106 may determine whether client 102 is biometric-enabled. As used in this disclosure "biometric-enabled" means that a device is capable or enabled to supply biometric identification information of the user and/or capable of establishing a user-authenticated secure communication link. For example, client 102 may be biometric-enabled if a particular setting is "on" in secure communications software module installed on client 102. Server 106 may determine whether first client 102 is biometric-enabled in many ways. For example, server 106 may refer to information, such as a device digital certificate, previously registered by client 102 with server 106 to determine whether client 102 is biometric-enabled. In one embodiment, the certificate may have a flag that indicates whether the device is biometric-enabled, i.e., enabled to supply the biometric identification information of the user. Thus, in making the determination of step 306, server 106 may consult the flag if it exists.

Figure 4:
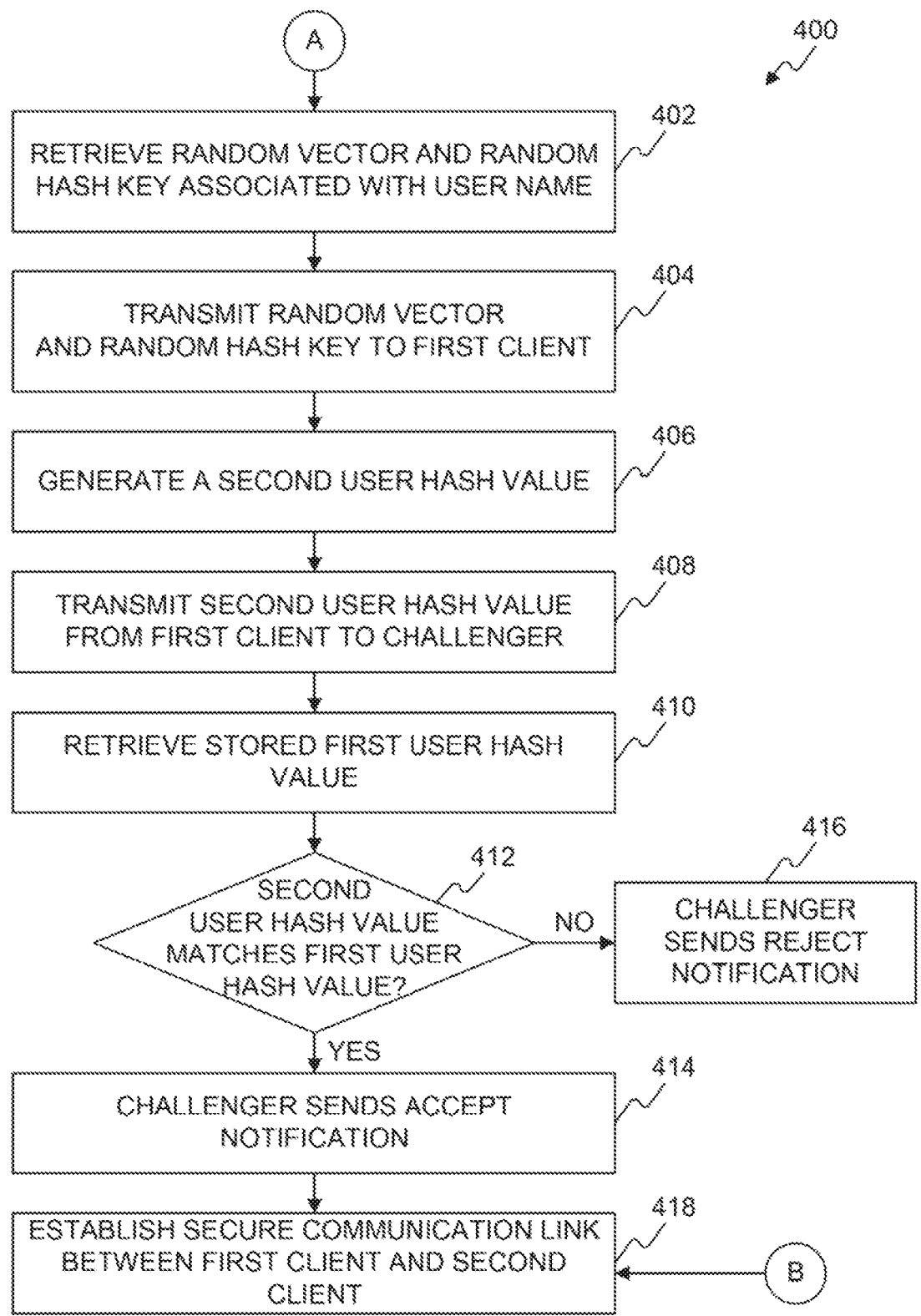
FIG. 4 shows another exemplary method of authenticating a user to provide a user-authenticated secure communication link, consistent with an embodiment of the present disclosure.

When server 106 determines that client 102 is biometric-enabled (Step 310, YES), server 106 may set itself as a "challenger" (Step 312) and proceed to authenticate the user of first client 102 (via "A" in FIG. 4). As used herein, "challenger" means a device which is challenging another device to properly authenticate its user.

When server 106 determines, however, that first client 102 is not biometric-enabled (step 310, NO), method 300 may proceed to step 314 in which server 106 may forward the DNS request received from client 102 to client 104. Method 300 may proceed to step 316 in which client 104 may decide whether user authentication is necessary. If, however, client 104 decides that user authentication is necessary (Step 316, YES), client 104 may set itself as the challenger (Step 318) and proceed to authenticate the user of client 102 (via "A" in FIG. 4). If client 104 decides, however, that user authentication is not necessary, client 104 may provide the secure network address of client 104 to client 102, and that secure network address may be used to establish a secure communication link between clients 102, 104. As discussed above, however, this link may be be vulnerable to access by nefarious users at client 102 who have not been authenticated by system 100. One of ordinary skill in the art would recognize that because client 102 and client 104 have not yet established a secure communication link 116, second client 104 may communicate with first client 102 during the challenge process via server 106, in some embodiments. In an alternative embodiment, if client 104 is the challenger, a direct communication link may be established between clients 102 and 104 that may be secure to the extent that the data transmitted on the link is encrypted. Clients 102 or 104 may not be aware of each other's secure network address at this time. Irrespective of who the challenger is, method 300 may proceed via "A" to step 402 of FIG. 4, which will be described in more detail below.

FIG. 4 shows a flowchart of an exemplary challenge method 400, consistent with an embodiment of the present disclosure. As further described below, the exemplary method of FIG. 4 may be implemented to execute the challenge process for authenticating the user and establishing a user-authenticated secure communication link 116 between first client 102 and second client 104.

As shown in FIG. 4, method 400, may include a step 402 for retrieving the random vector and random hash key associated with the user name of the user of first client 102. In one exemplary embodiment, the challenger (server 106 or client 104) may access database 112 to retrieve the random vector and random hash key. Accessing database 112 may involve reading information in database 112 from a memory or storage device associated with one of server 106 or client 104. The challenger may identify the random vector and random hash key stored in association with the user name and the device information of first client 102 in database 112.

Method 400 may include a step 404 of transmitting the random vector and random hash key corresponding to the user name to client 102. In one embodiment, when client 104 is the challenger, it may transmit the random vector and random hash key to server 106 which, in turn, may transmit the random vector and random hash key to client 102.

Method 400 may include a step 406 of generating a second user hash value based on the user identification information obtained previously in step 308 and the random vector and random hash key provided to client 102 by the challenger. In one exemplary embodiment, client 102 may generate the second user hash value in a manner similar to that described above with respect to step 212 of process 200 (FIG. 2).

Method 400 may further include a step 408 of transmitting the second user hash value from client 102 to the challenger. When server 106 is the challenger, client 102 may transmit the second user hash value to server 106 via communication link 108. Alternatively, if client 104 is the challenger, client 102 may transmit the second user hash value to server 106 via communication link 108, and server 106 may further transmit the second user hash value to second client 104 via communication link 110.

Method 400 may also include a step 410 of retrieving the hash value corresponding to the user and client 102. This hash value may be referred to as "first user hash value." In one exemplary embodiment, the challenger (server 106 or client 104) may retrieve the first user hash value stored in association with the user name from database 112. The challenger may retrieve the first user hash value in a manner similar to the challenger's retrieval of the random vector and random hash key described above with regard to step 402. One of ordinary skill in the art would recognize that the challenger may retrieve the random vector, the random hash key, and the first user hash value simultaneously or sequentially.

Method 400 may include a step 412 of determining whether the second user hash value received by the challenger from client 102 matches the first user hash value stored in database 112. When the challenger determines that the second user hash value matches the first user hash value (step 412, YES), the challenger may send an accept notification to client 102 notifying client 102 that the user has been authenticated (Step 414). When the challenger determines, however, that the second user hash value does not match the first user hash value (step 412, NO), the challenger may send a reject notification to client 102 notifying client 102 that the user has not been authenticated (step 416).

As part of step 414, server 106 may provide client 102 with the secure network address of second client 104 in response to the DNS request transmitted by client 102. One of ordinary skill in the art would recognize that when client 104 is the challenger, it may notify server 106 that the user has been authenticated in step 414. After receiving the notification from client 104, server 106 may send the secure network address of client 106 to client 104. Server 106 may or may not have the secure network address of client 104, in which case client 104 may provide its secure network address to server 106 once the user has been authenticated. Server 106 may then transmit the secure network address of client 104 to client 102 as part of step 414.

In one exemplary embodiment, client 104 may also be a server and may be "headless." As used in this disclosure, "headless" refers to a device which does not have an operator's console and/or a user at the console. In this exemplary embodiment, only one user, the user of client 102 may need to be authenticated.

Although the above description discusses authentication of a user of client 102, a user of another client 104 may be authenticated using methods 300 and 400 in a similar manner. One of ordinary skill in the art would recognize that during authentication of a user of client 104, server 106 and/or client 102 may play the role of the challenger. One of ordinary skill in the art would also recognize that in addition to authenticating users of clients 102, 104, clients 102, 104 may also be authenticated using methods 300 and 400 described above. For example, by including information regarding clients 102 and 104 in the user identification information, methods 300 and 400 may be used to authenticate clients 102, 104 in addition to users of clients 102, 104. Further, one of ordinary skill in the art would recognize that after the user of client 106 has been authenticated, server 106 may send the secure network address of first client 102 to second client 104.

Method 400 may also include a step 418 in which client 102 may establish secure communication link 116 with client 104 for the user of client 102, who has been authenticated in proceeding steps 402-414. One of ordinary skill in the art would recognize that when users of both clients 102, 104 are authenticated, communications transmitted over secure communication link 116 can be trusted by clients 102, 104 as originating from authenticated users.

Figure 5:
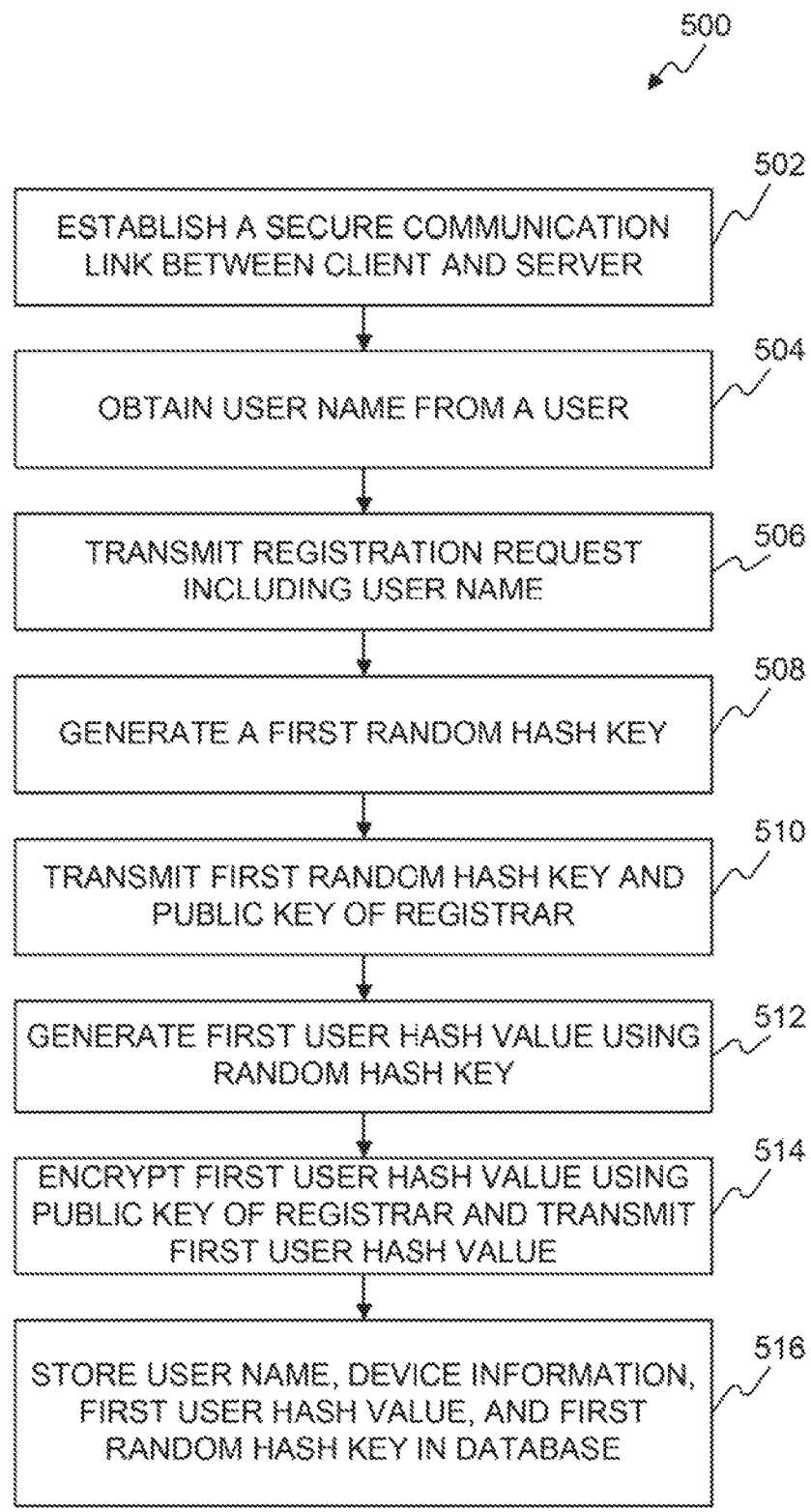
FIG. 5 shows another exemplary method of registering a user, consistent with an embodiment of the present disclosure.

FIG. 5 shows a flowchart of an exemplary registration method 500, consistent with an embodiment of the present disclosure. Method 500 is similar to method 200 in certain aspects. In particular, FIG. 5 describes a variation of the exemplary embodiment set forth with respect to FIG. 2 and therefore, an explanation of the common elements between these two embodiments is omitted in the interest of conciseness. Rather, FIG. 5 is explained primarily in terms of exemplary differences between the methods of FIGS. 2 and 5. As explained below, the steps of method 500 may be implemented by the processor(s) of client 102, client 104, and/or server 106 executing computer-readable program instructions stored in memory.

Step 502 may be similar to step 202. Step 504 may be similar to step 204. Step 506 may be similar to step 206. Step 508 may be similar to step 208 except that a first random hash key (HK1) may be generated by server 106 instead of a random hash key and a random vector. Similar to step 210, method 500 may include a step 510 of transmitting HK1, except that no random vector is transmitted in step 510. In one exemplary embodiment, server 106 may transmit HK to client 102. Additionally, in step 510, server 106 may transmit a public key of server 106 (which may be acting as a registrar).

Method 500 may further include a step 512 of generating a first user hash value representing the user based on HK1. In one exemplary embodiment, client 102 may generate a first user hash value (X) representing the user by performing a hashing operation on the user identification vector using HK1 provided by server 106. Client 102 may employ hashing algorithms well known in the art to generate the first user hash value (X).

Method 500 may also include a step 514 of transmitting the first user hash value (X). In one exemplary embodiment, client 102 may transmit X to server 106. Further, process 500 may include a step 516 of storing the user name in database 112. Step 516 may also include storing device information of client 102, HK1, and X, in association with the user name in database 112. In one exemplary embodiment, server 106 may store the user name, device information of client 102, HK1, and X in association with each other in database 112.

One of ordinary skill in the art would recognize that biometric information of the same user, collected on different devices, may be different, for example, due to characteristics or settings of the device on which the biometric information was collected. One of ordinary skill in the art would further recognize that to correctly identify a user and the user's device, e.g., client 102, it may be necessary to associate device information of the device on which biometric information was obtained for a user with the user name of the user. Server 106 may pre-register users of client 102 in database 112 using method 500. Further, server 106 may pre-register users of client 104 in database 112, using method 500, in a manner similar to that described above with respect to registering users of client 102. However, it is to be appreciated that registration method 500 may be performed at any time before or during the course of establishing of communication link 116.

As discussed above with reference to the registration process of FIG. 2, a similar registration process may occur with respect to databases associated with clients 102 and 104. For example, in addition to registering with server 106, client 102 may register itself with client 104. Further, as discussed earlier, in the event clients 102 and 104 register with each other, the registration process may be carried out through server 106, which may act as an intermediary. Alternatively, clients 102 and 104 may establish a communication link with each other that may be secure to the extent that the data transmitted on the link is encrypted. Clients 102 or 104 may not be aware of each other's secure IP or network address at this time.

Figure 6:
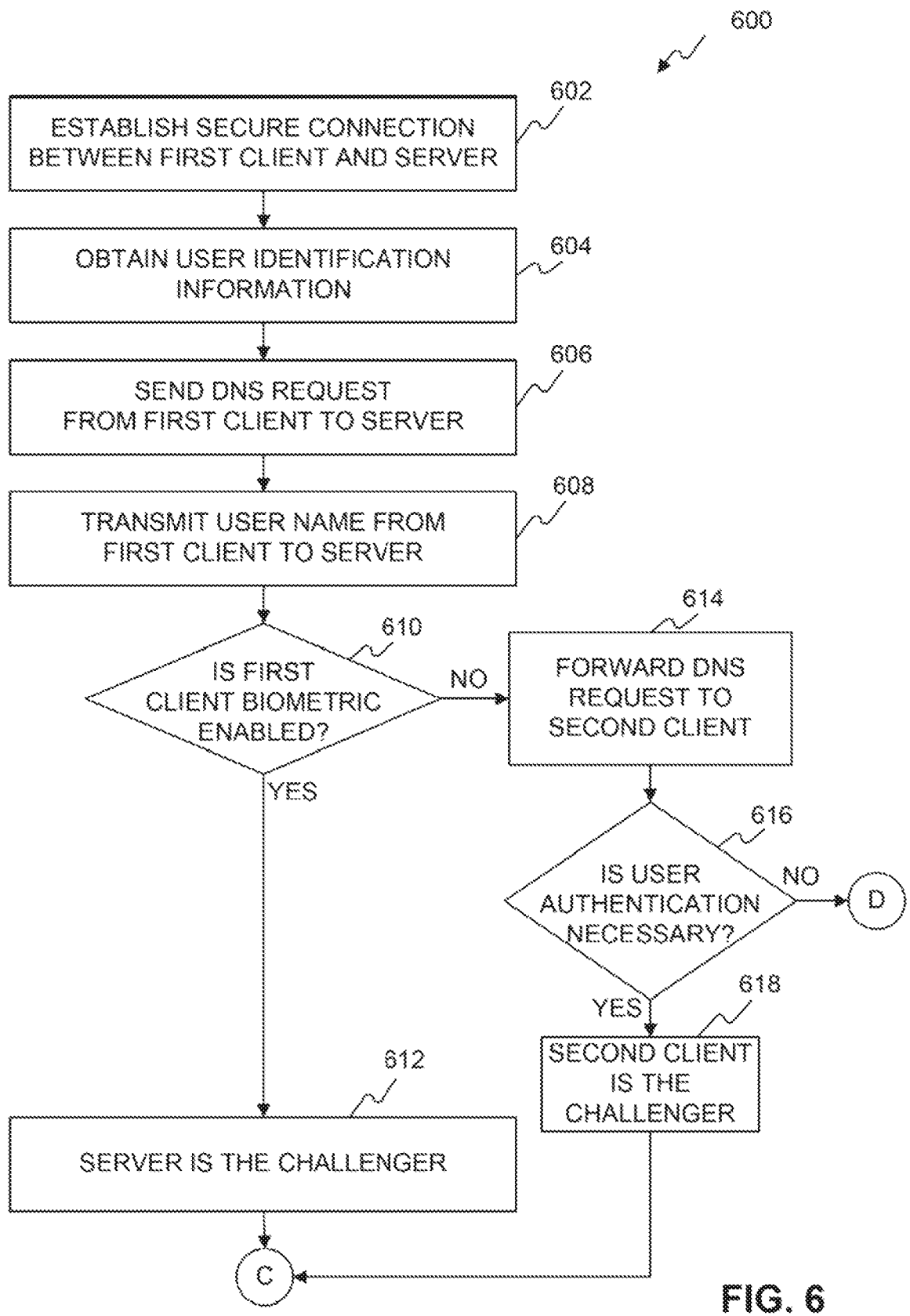
FIG. 6 shows another exemplary method of authenticating a user to provide a user-authenticated secure communication link, consistent with embodiments of the present disclosure.

FIG. 6 shows a flowchart for establishing a user-authenticated secure communication link between client 102 and client 104, consistent with an embodiment of the present disclosure. In some embodiments, the method 600 may occur after the registration process of FIG. 5. In other embodiments, however, the registration process of FIG. 5 may be performed as part of or during the course of method 600. Each of the steps in method 600 is similar to steps in method 300. For example, step 602 in method 600 is similar to step 302 in method 300. Similarly, step 616 in method 600 is similar to step 313 in method 300. Accordingly, the steps of method 600 are not described herein for conciseness. As with the other disclosed methods, the steps of method 600 may be implemented by the processor(s) of client 102, client 104, and/or server 106 executing computer-readable program instructions stored in memory.

Figure 7:
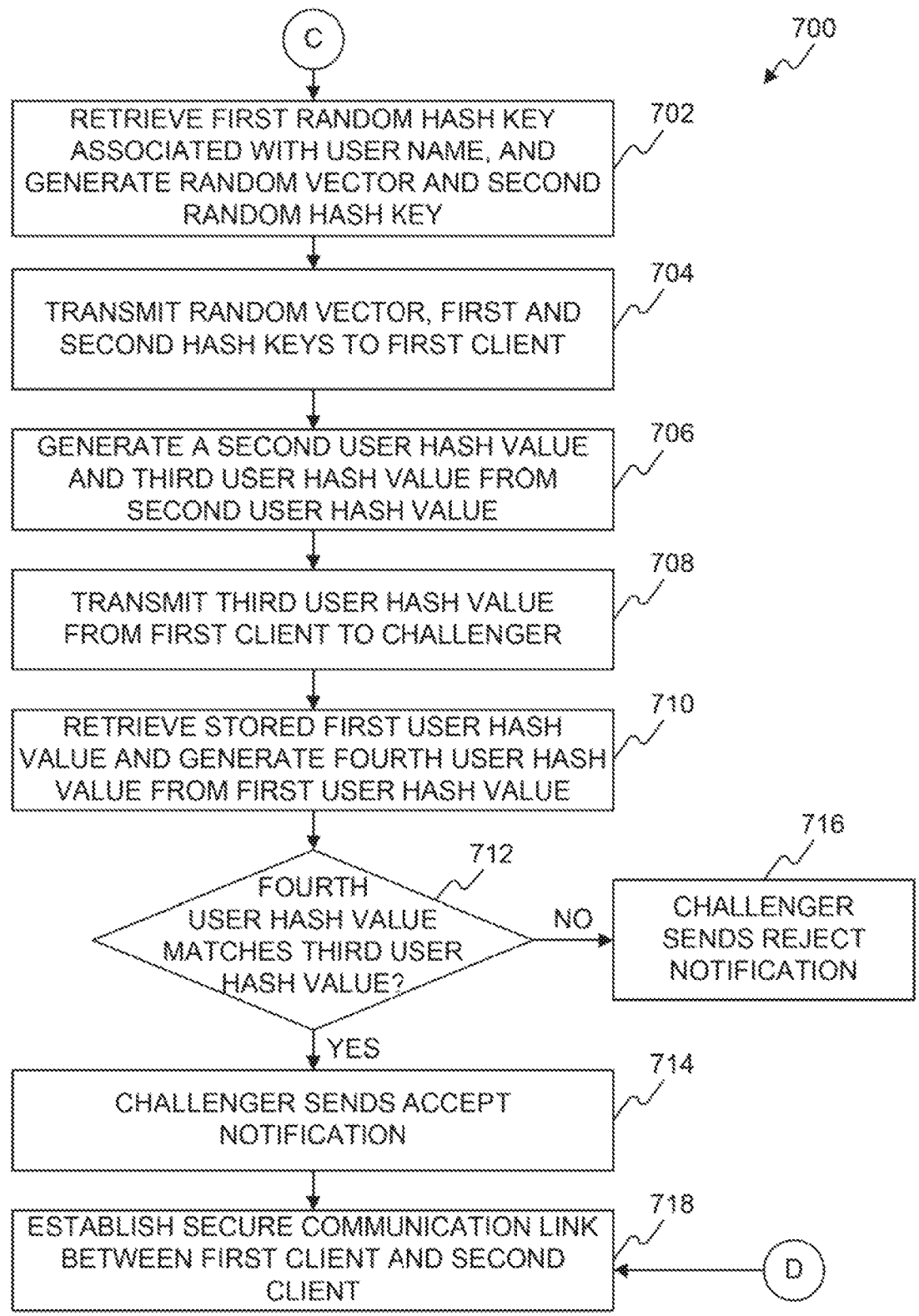
FIG. 7 shows another exemplary method of authenticating a user to provide a user-authenticated secure communication link, consistent with an embodiment of the present disclosure.

FIG. 7 shows a flowchart of an exemplary challenge method 700, consistent with an embodiment of the present disclosure. As further described below, the exemplary method of FIG. 7 may be implemented to execute the challenge process for authenticating the user and establishing a user-authenticated secure communication link 116 between client 102 and client 104. Method 700 is similar to method 400 in certain respects. One difference between method 700 and method 400 is that, in method 700, the user identification vector is not revealed to the registrar and the challenger. As with the other disclosed methods, the steps of method 700 may be implemented by the processor(s) of client 102, client 104, and/or server 106 executing computer-readable program instructions stored in memory.

As shown in FIG. 7, method 700, may include a step 702 for retrieving the first random hash key associated with the user name of the user of client 102. In one exemplary embodiment, the challenger (server 106 or client 104) may access database 112 to retrieve the first random hash key (HK1). Accessing database 112 may involve reading information in database 112 from a memory or storage device associated with one of server 106 or client 104. The challenger may identify the first random hash key stored using the user name and the device information of first client 102 in database 112. In step 702, challenger may also generate a random vector, which may include randomly-selected values. The random vector may be one-dimensional or multi-dimensional, and may have a randomly-selected size. Challenger may further generate a second random hash key (HK2).

Method 700 may include a step 704 of transmitting the random vector, HK1, and HK2. In one embodiment, when client 104 is the challenger, it may transmit the random vector, the random hash keys (HK1 and HK2) to server 106 which, in turn, may transmit them to client 102.

Method 700 may include a step 706 of generating a second user hash value (X') based on the user identification information obtained previously in step 604 and HK1. In one exemplary embodiment, client 102 may generate X' in a manner similar to that described above with respect to step 512 of process 500 (FIG. 5). In step 706, client 102 may further generate a third user hash value (V) from the second user hash value (X'). For example, client 102 may perform an exclusive OR between X' and the random vector received from challenger to get a first resulting vector (Z). Next, client 102 may take a hash of Z using the second random hash key (HK2) to obtain the third user hash value (V).

Method 700 may further include a step 708 of transmitting the third user hash value (V) from client 102 to the challenger. When server 106 is the challenger, client 102 may transmit V to server 106 via communication link 108. Alternatively, if client 104 is the challenger, client 102 may transmit V to server 106 via communication link 108, and server 106 may further transmit V to second client 104 via communication link 110.

Method 700 may also include a step 710 of retrieving the first user hash value (X) corresponding to the user and client 102. In one exemplary embodiment, the challenger (server 106 or client 104) may retrieve X stored in association with the user name from database 112. The challenger may retrieve X in a manner similar to the challenger's retrieval of the first random hash key (HK1) described above with regard to step 702. Next, the challenger may generate a fourth user hash value (V') based on X. For example, the challenger may generate a second resulting vector (Z') by performing an exclusive OR between X and the random vector that challenger sent to client 102 in step 704. Challenger may then obtain V' by taking a hash of Z' using the second random hash key (HK2).

Method 700 may include a step 712 of determining whether the third user hash value (V) received by the challenger from client 102 matches the fourth user hash value (V'). When the challenger determines that they match (step 712, YES), the challenger may send an accept notification to client 102 notifying client 102 that the user has been authenticated (Step 714). When the challenger determines, however, that the hash values do not match (step 712, NO), the challenger may send a reject notification to client 102 notifying client 102 that the user has not been authenticated (step 716).

As part of step 714, server 106 may provide client 102 with the secure network address of client 104 in response to the DNS request transmitted by client 102. One of ordinary skill in the art would recognize that when client 104 is the challenger, it may notify server 106 that the user has been authenticated in step 414. After receiving the notification from client 104, server 106 may send the secure network address of client 106 to client 104. Server 106 may or may not have the secure network address of client 104, in which case client 104 may provide its secure network address to server 106 once the user has been authenticated. Server 106 may then transmit the secure network address of client 104 to client 102 as part of step 714.

In one exemplary embodiment, client 104 may also act as a server and may be "headless." As used in this disclosure, "headless" refers to a device which does not have an operator's console and/or a user at the console. In this exemplary embodiment, only one user, the user of client 102 may need to be authenticated.

Although the above description discusses authentication of a user of client 102, a user of another client 104 may be authenticated using methods 600 and 700 in a similar manner. One of ordinary skill in the art would recognize that during authentication of a user of client 104, server 106 and/or client 102 may play the role of the challenger. One of ordinary skill in the art would also recognize that in addition to authenticating users of clients 102, 104, clients 102, 104 may also be authenticated using methods 600 and 700 described above. For example, by including information regarding clients 102 and 104 in the user identification information, methods 600 and 700 may be used to authenticate clients 102, 104 in addition to users of clients 102, 104. Further, one of ordinary skill in the art would recognize that after the user of client 106 has been authenticated, server 106 may send the secure network address of first client 102 to second client 104.

Method 700 may also include a step 718 in which client 102 may establish secure communication link 116 with client 104 for the user of client 102, who has been authenticated in preceding steps 702-714. One of ordinary skill in the art would recognize that when users of both clients 102, 104 are authenticated, communications transmitted over secure communication link 116 can be trusted by clients 102, 104 as originating from authenticated users.

While the exemplary methods and processes may be described herein as a series of steps, it is to be understood that the order of the steps may be varied. In particular, non-dependent steps may be performed in any order, or in parallel. Moreover, the above-noted features and other aspects and principles of the present invention may be implemented in various environments. Such environments and related applications may be specially-constructed for performing the various processes and operations of the invention or they may include a general-purpose computer or computing platform selectively activated or reconfigured by code to provide the necessary functionality. The processes disclosed herein are not inherently related to any particular computer or other apparatus, and may be implemented by a suitable combination of hardware, software, and/or firmware. For example, various general-purpose machines may be used with programs written in accordance with teachings of the disclosure, or it may be more convenient to construct a specialized apparatus or system to perform the required methods and techniques.

Systems and methods consistent with the present invention also include computer readable media that include program instruction or code for performing various computer-implemented operations based on the methods and processes of the disclosure. The media and program instructions may be those specially designed and constructed for the purposes of the disclosure, or they may be of the kind well known and available to those having skill in the computer software arts. Examples of program instructions include for example machine code, such as produced by a compiler, and files containing a high level code that can be executed by the computer using an interpreter.

Other embodiments of the disclosure will be apparent to those skilled in the art from consideration of the specification and practice of the embodiments disclosed herein. It is intended that the specification and examples be considered as exemplary only, with a true scope and spirit of the invention being indicated by the following claims.

What is claimed is:

1. A method for registering a client with a domain name server for secure communications, the method comprising:
   (1) receiving, at the domain name server from the client, a user name associated with a user of the client;
   (2) generating, at the domain name server based on receipt of the user name, a random vector and a random hash key;
   (3) transmitting, from the domain name server to the client, the random vector and random hash key;
   (4) receiving, at the domain name server from the client, a hash value, the hash value generated by hashing a user vector using the random hash key, wherein the user vector is a combination of the random vector and a biometric identification vector including biometric information of the user; and
   (5) registering, in a database, the user name in association with the received hash value to authenticate domain name service requests from the client.

2. The method of claim 1, further comprising:
   establishing a secure connection between the domain name server and the client; and
   performing steps (1) to (4) using the secure connection.

3. The method of claim 1, wherein the client sends the hash value to the domain name server in connection with a domain name service request.

4. The method of claim 1, further comprising:
   receiving, at the domain name server from the client, a registration request including the user name; and
   performing steps (2) to (5) in response to the registration request.

5. The method of claim 1, wherein the user vector is created by combining the random vector with the biometric identification vector.

6. A domain name server configured to register a client for secure communications, the domain name server comprising:
   a data storage device; and
   one or more processors configured to:
   (1) receive, from the client, a user name associated with a user of the client;
   (2) generate, based on receipt of the user name, a random vector and a random hash key;
   (3) transmit, to the client, the random vector and random hash key;
   (4) receive, from the client, a hash value, the hash value generated by hashing a user vector using the random hash key, wherein the user vector is a combination of the random vector and a biometric identification vector including biometric information of the user; and
   (5) register, in a database stored in the data storage device, the user name in association with the received hash value to authenticate domain name service requests from the client.

7. The domain name server of claim 6, wherein the one or more processors are further configured to:
  establish a secure connection between the domain name server and the client; and
  perform steps (1) to (4) using the secure connection.

8. The domain name server of claim 6, wherein the client sends the hash value to the domain name server in connection with a domain name service request.

9. The domain name server of claim 6, wherein the one or more processors are further configured to:
  receive, from the client, a registration request including the user name; and
  perform steps (2) to (5) in response to the registration request.

10. The domain name server of claim 6, wherein the user vector is created by combining the random vector with the biometric identification vector.

11. A method performed by a client for registering with domain name server for secure communications, the method comprising:
  sending, to the domain name server, a user name associated with a user of the client;
  receiving, from the domain name server, a random vector and a random hash key generated by the domain name server, wherein the random vector and the random hash key are generated based at least in part on the user name;
  receiving biometric information of the user and generating a biometric identification vector based on the biometric information;
  generating a user vector as a combination of the random vector and the biometric identification vector;
  generating a hash value by hashing the user vector using the random hash key; and
  sending, to the domain name server, the hash value.

12. The method of claim 11, further comprising:
  establishing a secure connection between the domain name server and the client; and
  communicating with the domain name server using the secure connection.

13. The method of claim 11, further comprising sending, to the domain name server, a registration request including the user name.

14. The method of claim 11, further comprising creating, by the client, the user vector by combining the random vector with the biometric identification vector.

15. The method of claim 11, wherein biometric information of the user includes at least one of: a photograph, a fingerprint, a speech sample, a facial image, or an image of a retina or iris.

16. A client device configured to register with a domain name server for secure communications, the client device comprising:
  a data storage device storing (1) a user name associated with a user of the client device and (2) a biometric identification vector generated based on biometric information of the user; and
  one or more processors configured to:
    send the user name to the domain name server;
    receive, from the domain name server, a random vector and a random hash key generated by the domain name server, wherein the random vector and the random hash key are generated based at least in part on the user name;
    generating a user vector as a combination of the random vector and the biometric identification vector;
    generate a hash value by hashing the user vector using the random hash key; and
    send, to the domain name server, the hash value.

17. The client device of claim 16, wherein the one or more processors are further configured to:
  establish a secure connection between the domain name server and the client; and
  communicate with the domain name server using the secure connection.

18. The client device of claim 16, wherein the one or more processors are further configured to send, to the domain name server, a registration request including the user name.

19. The client device of claim 16, wherein the one or more processors are further configured to create the user vector by combining the random vector with the biometric identification vector.

20. The client device of claim 16, wherein biometric information of the user includes at least one of: a photograph, a fingerprint, a speech sample, a facial image, or an image of a retina or iris.

* * * * *